United States Patent [19]

Schmitt

[11] 3,940,911
[45] Mar. 2, 1976

[54] HARVESTERS

[76] Inventor: Helwig Schmitt, 3523 Raiffeisenstrasse 5, 3523 Grebenstein, near Kassel, Germany

[22] Filed: Apr. 4, 1974

[21] Appl. No.: 457,736

[30] Foreign Application Priority Data
Apr. 5, 1973   Germany............................ 2317048

[52] U.S. Cl. .............................. 56/14.6; 130/27 R
[51] Int. Cl.² ............................................ A01D 41/06
[58] Field of Search ...................... 56/14.3–14.6; 130/27 R

[56] References Cited
UNITED STATES PATENTS

| 759,391 | 5/1904 | McGrane | 130/27 R |
| 1,932,714 | 10/1933 | Thoen | 56/14.6 |
| 3,411,274 | 11/1968 | Jarvis | 56/14.6 |
| 3,537,243 | 11/1970 | Bichel | 56/14.6 |
| 3,623,302 | 11/1971 | Schmitt | 56/14.6 |

FOREIGN PATENTS OR APPLICATIONS

| 219,331 | 1/1962 | Austria | 130/27 R |

Primary Examiner—Russell R. Kinsey
Attorney, Agent, or Firm—Robert L. Farris

[57] ABSTRACT

Combined harvesting and threshing machine which can be mounted as a compact single unit on the front of a self-propelled power unit. Crop is cut by a cutterbar and fed by an auger to a threshing cylinder at one end of a crop gathering table. The threshing cylinder discharges threshed crop onto the input end of straw walkers mounted above the cutterbar.

6 Claims, 17 Drawing Figures

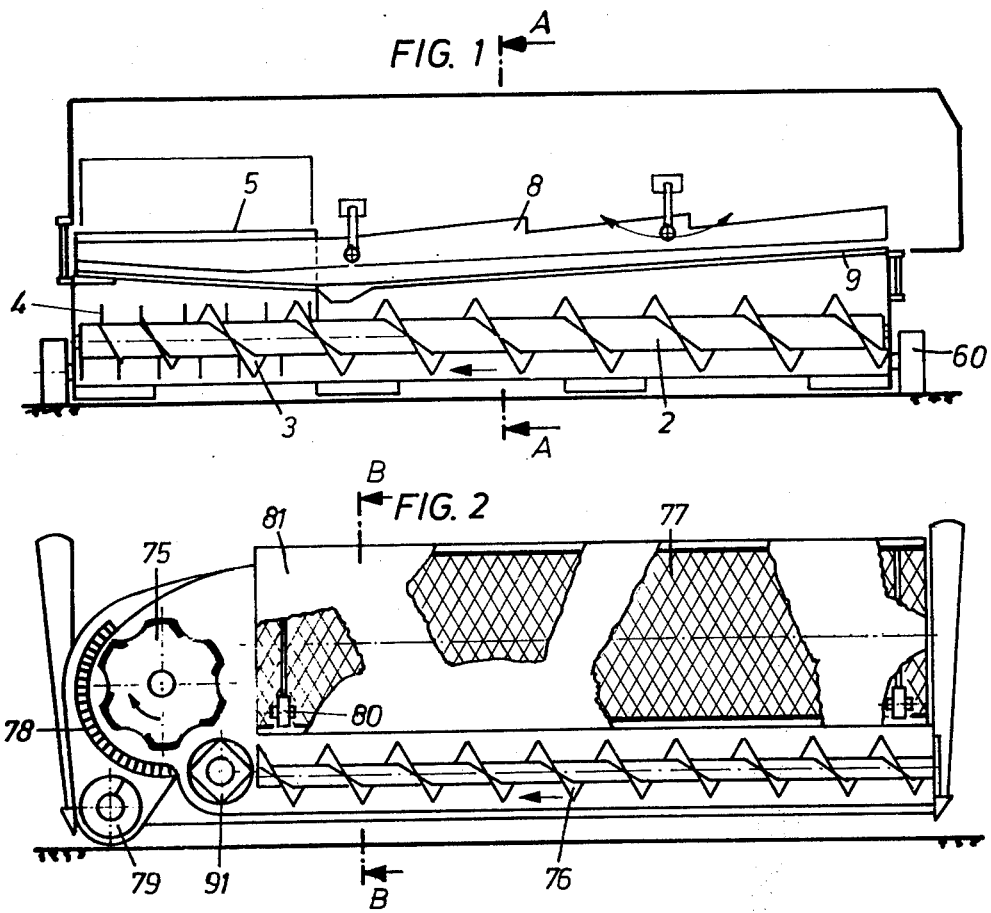
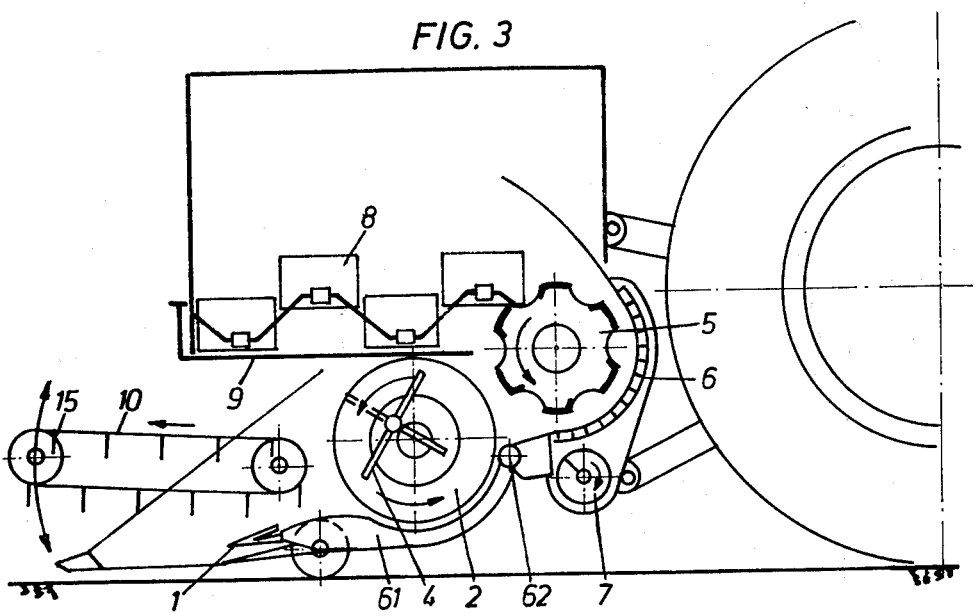

HARVESTERS

This invention relates to harvesters for such crops as wheat, barley, maize, rice, soya beans, ground nuts and other crops which require threshing in order to separate seed from other crop material. In this specification such crops are hereafter referred-to as grain crops.

According to the invention there is provided a harvester comprising crop gathering means, crop threshing means, and conveyor means operative to carry gathered unthreshed crop in a first direction towards the crop threshing means and operative to carry threshed crop away from the crop threshing means in the direction opposite to said first direction, characterized in that the conveyor means comprises separate feed-in and feed-out conveyors operative to feed crop towards and away from respectively the crop threshing means, the feed-out conveyor being positioned above the feed-in conveyor and being drivable independently thereof.

Several embodiments of the invention will now be described by way of example with reference to the accompanying drawings, in which:

FIG. 1 is a front elevation view of a harvester having straw walkers positioned above a front auger, and constituting a first embodiment of the invention;

FIG. 2 is a view similar to that of FIG. 1, of a second embodiment of the invention having rotary separating apparatus in place of the straw walkers;

FIG. 3 shows a section on the line A—A in FIG. 1 and also shows a crop gathering reel not seen in FIG. 1;

Figure 13:
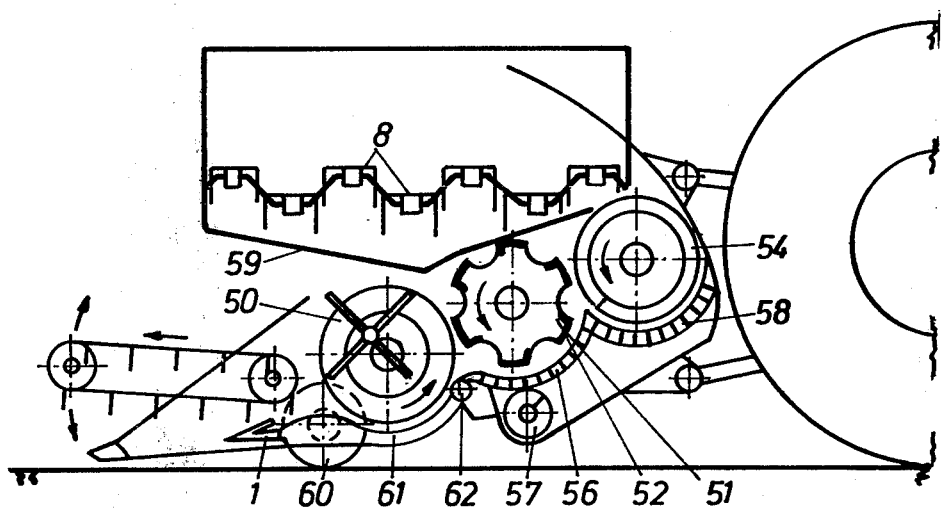
Figure 14:
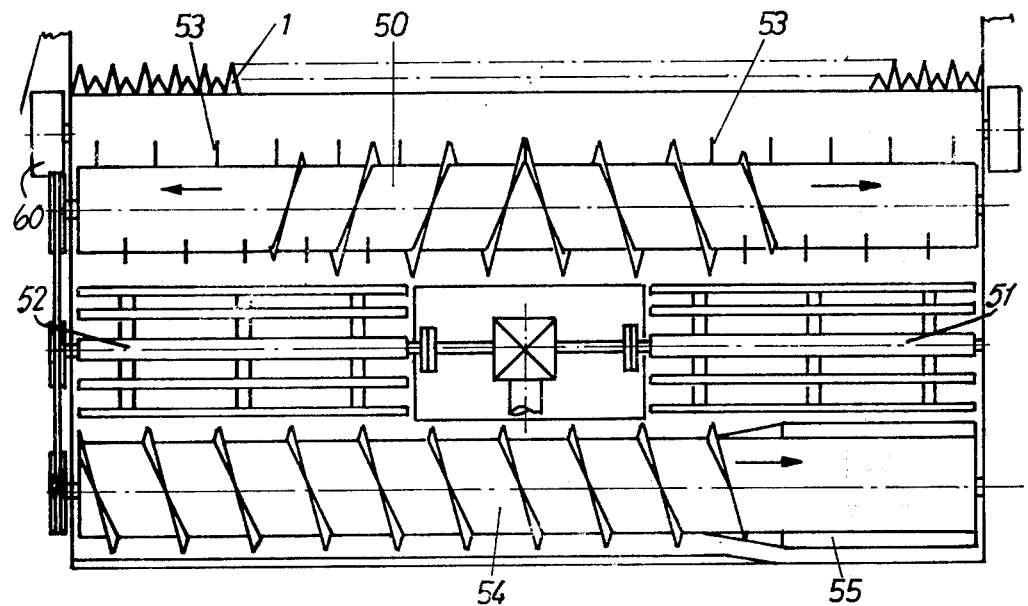
Figure 15:
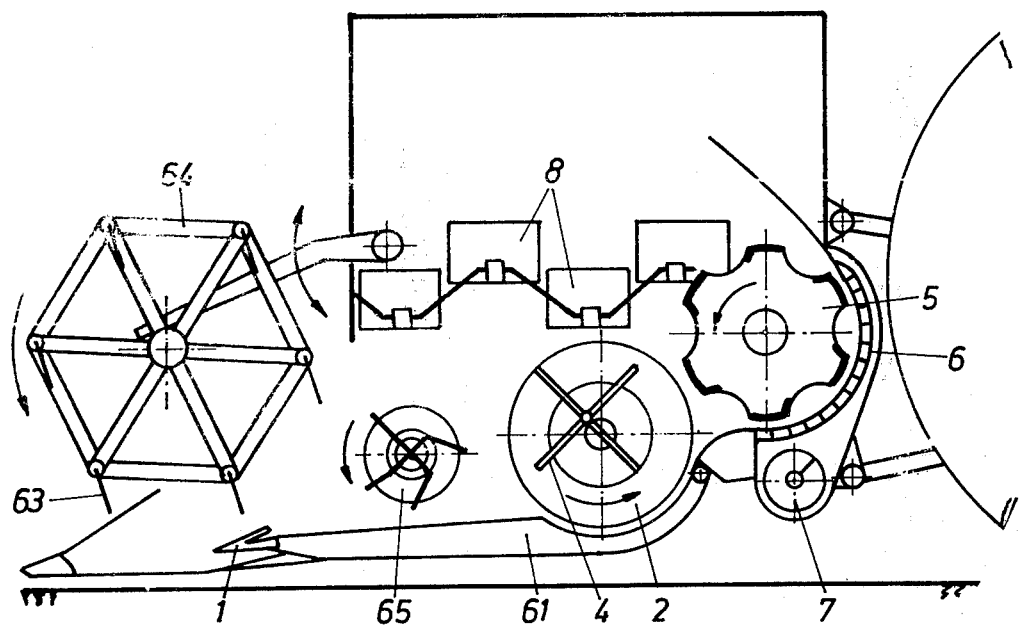
Figure 16:
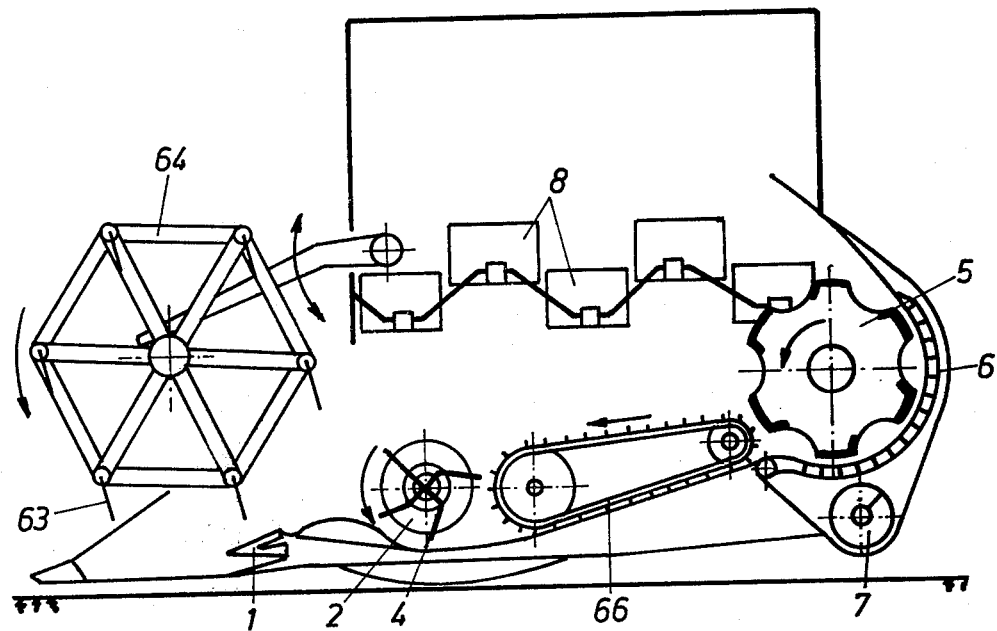
Figure 17:
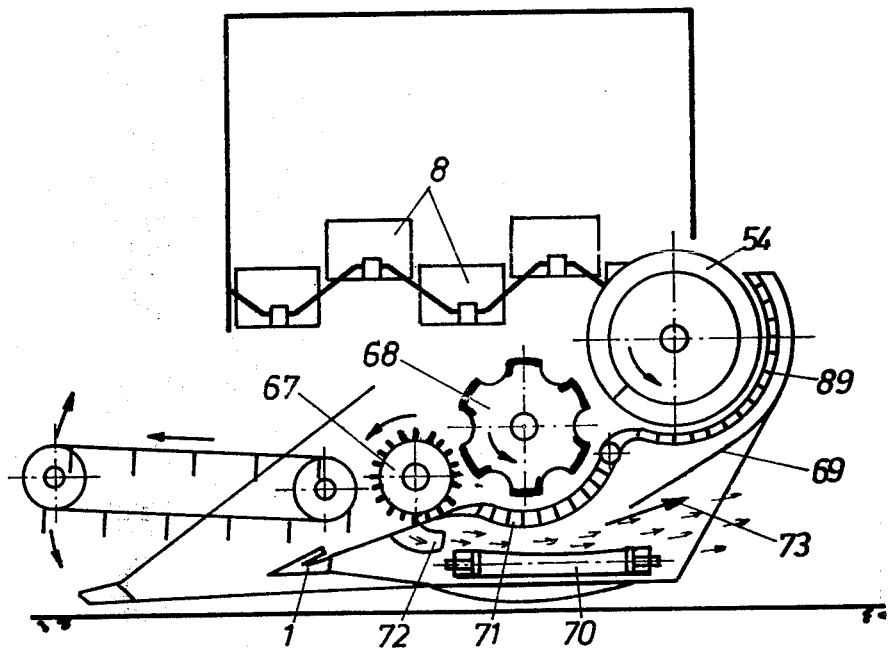

FIGS. 13 and 14 show an end elevation and plan view respectively of a still further embodiment of the invention, in which a threshing cylinder is provided at each end of a crop gathering table, the threshing cylinder being fed by a single auger having flights of opposite hand and the threshed crop from the cylinders being gathered by a common auger which co-operates with a concave to effect further grain separation;

FIG. 15 shows, in a view similar to that of FIG. 3, another embodiment, in which a conventional combine reel is used, together with a conveying drum to feed crop rearwards immediately after it has been cut by a cutterbar;

FIG. 16 shows an end elevation view of a further embodiment, otherwise similar to that of FIG. 15 but having an auger positioned immediately behind a cutter bar and a chain and slat conveyor feeding crop to the threshing apparatus;

FIG. 17 shows an end elevation view of yet another embodiment, incorporating further modifications of the crop feeding arrangements.

As shown in FIGS. 1, 3, 5 and 7 a grain crop harvester to be mounted on the front of a self propelled power unit or tractor comprises a crop gathering table having a cutter-bar 1 in front of a feeding auger 2 (constituting a feed-in conveyor) which conveys the crop to the right hand end of the table (looking in the travel direction) to a position in front of a threshing mechanism 5, 6. Due to the gradual reduction of the height of the auger flight 3 in front of the threshing mechanism, the crop is equally distributed over the complete width of the threshing mechanism. A series of retractible fingers 4 (constituting discharge elements) mounted in the cylinder of the feeding auger 2 feed the crop rearwards to the gap between the threshing cylinder 5 and the concave 6 of the threshing mechanism.

Figure 7:
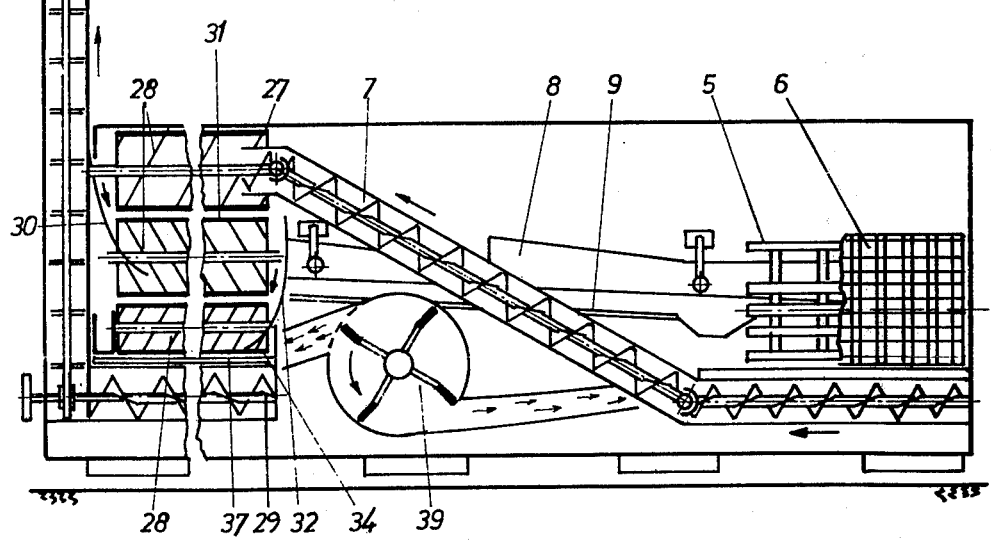
FIG. 7 shows a rear elevation view of the FIG. 1 embodiment with certain portions cut away for purposes of illustration and shows the threshing mechanism, and the grain cleaning apparatus which is also seen in FIG. 5.

In use, most of the threshed grain falls through the concave 6 onto a conveying auger 7 (FIG. 7) which conveys the grain to a cleaning device 27, 28 (see FIG. 7). The straw with the remaining grain is thrown in a forward direction by the threshing cylinder 5 onto straw walkers 8 which are positioned above the feeding auger 2. The straw walkers 8 constitute a feed-out conveyor and convey the straw in the opposite direction to the direction of movement of crop on the feeding auger 2, that is to the left hand end of the table (as seen in FIG. 7) and drop it onto the ground. The grain remaining in the straw after threshing is separated during this conveying operation on the walkers 8. This separated grain falls onto a pan 9 under the walkers and from here into the conveying auger 7.

Figure 5:
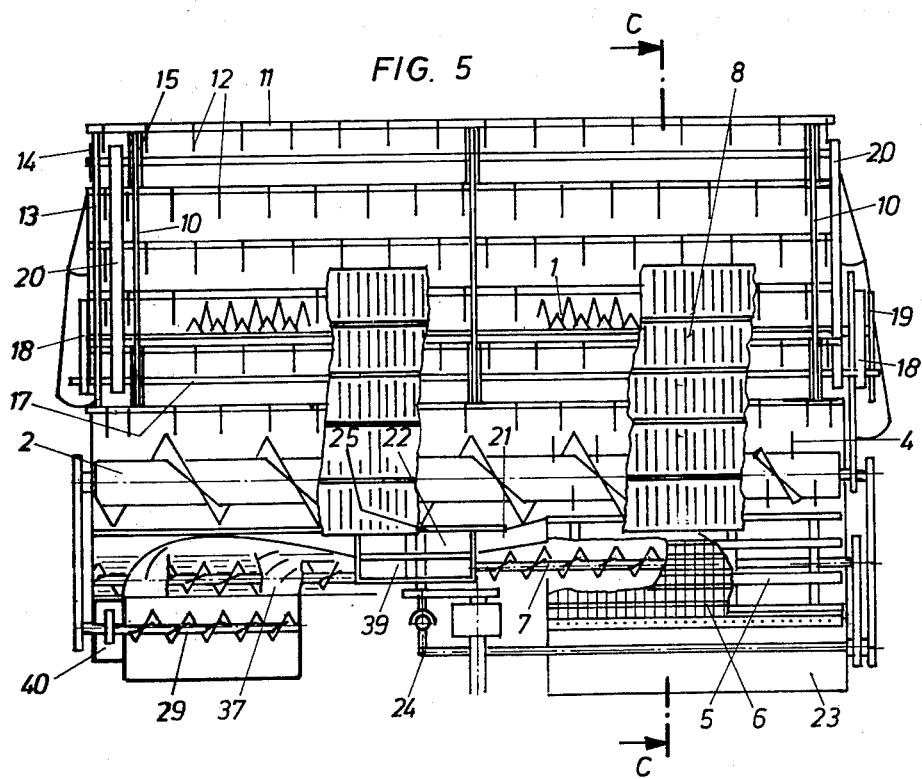
FIG. 5 shows a plan view of the FIG. 1 embodiment with certain portions cut away for purposes of illustration and includes the crop gathering reel of FIG. 3 together with grain cleaning apparatus to remove chaff etc. from separated grain.
Figure 11:
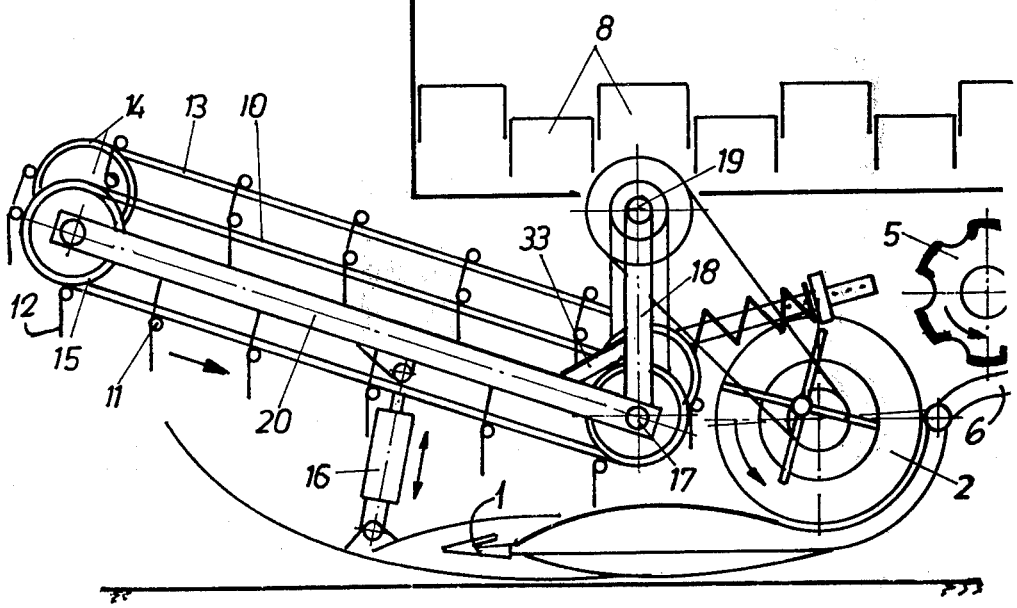
FIG. 11 shows a section on the line C—C in FIG. 5, and, in a view similar to that of FIG. 3 illustrates details of the method of mounting driving and adjusting the crop gathering reel.

As shown in FIGS. 3, 5 and 11, for feeding standing crop to the cutter-bar 1 which is positioned in front of or beneath the walkers 8 and from here to the feeding auger 2 which is also positioned beneath the walkers 8, the use of a band reel as shown in FIGS. 3, 5 and 11 is desirable. Such a reel requires less space in the vertical direction than a conventional combine reel. The band reel comprises circulating endless chains or belts 10 on which cross bars 11 are mounted. The cross bars carry tines 12.

In order to produce positive transport of the crop material, the attitude of the tines 12 is controlled so that the tines remain in a downwardly projecting attitude. For this purpose, the cross bars 11 are equipped with an attitude control linkage which is driven by an additional endless chain or belt 13. The axes of the pulleys or sprockets 14 for the belt or chain 13 are offset from the axes of the sprockets 15 for the chains 10 whereby the tines 12 are maintained in a downwardly projecting attitude by being connected to the belt or chain 13.

The attitude of the tines can be adjusted by adjustment of the position of each sprocket 14 relative to the axis of its respective sprocket 15 in an arc centred on the axis of the sprocket 15.

The complete band reel is adjustable in attitude relative to the ground surface. This adjustment is effected by a hydraulic ram 16 (FIG. 11) which pivots the band reel about a shaft 17 on which sprockets 15 are journalled.

If the distance between the cutter-bar 1 and the walkers 8 allows a higher position of the band reel 10, 11, 12, then the reel carrying arms 20 can be pivoted on upper pivot points 19.

A buffer 33 is mounted on each reel carrying arm 20 for engagement with respective upstanding arms 18 to limit upward angular movement of the reel when the reel is pivoted on shaft 17. The effect of the buffers is that, on pivoting the reel upwards, after engagement of the buffers with arms 18 both arms 20 and arms 18 are pivoted, whereby the position of the rear shaft 17 relative to the feeding auger 2 is changed.

As shown in FIGS. 5 and 7, the grain-chaff mixture separated by the threshing concave 6 is subjected to a cleaning stage while beneath the threshing concave, by an air current, before the grain reaches the conveying auger 7. The air flow is produced by a fan 22, 39 and emerges from an air channel 21.

Figure 12:
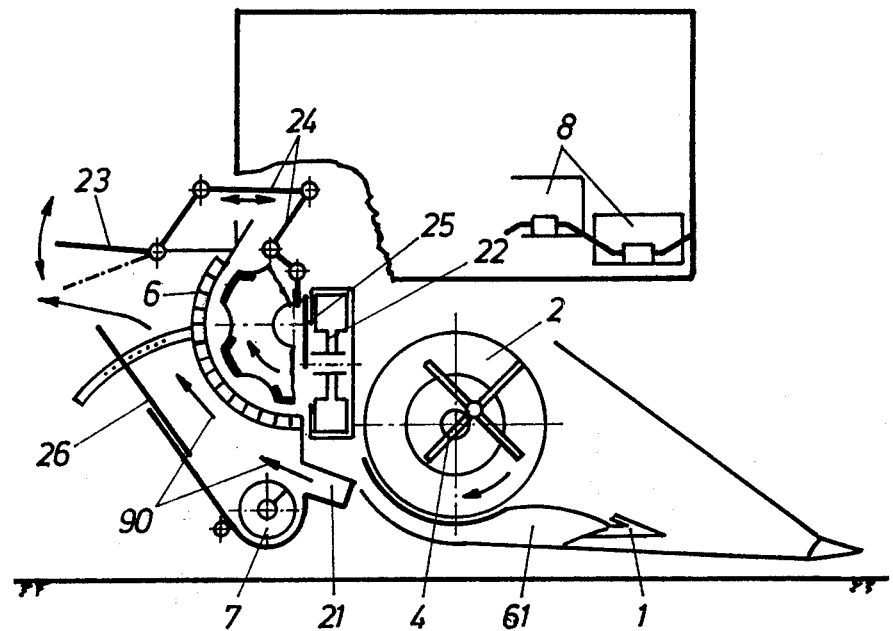
FIG. 12 shows an end elevation of a further embodiment which is otherwise similar to that of FIG. 1 but which uses a self-regulating blower to separate grain from chaff underneath the crop threshing apparatus.

As shown in FIG. 12, the air pressure generated by fan 22, 39 is automatically regulated according to the quantity of chaff underneath the threshing concave 6. The air coming out of the air channel 21 acts in the direction of arrow 90 against a hinged deflector plate 23 which is positioned in the outlet opening. If the air pressure is too high the deflector plate 23 is pushed upwards and an orifice leading to the suction side of the fan 22 is closed by a plate 25 which is connected by a linkage 24 with the deflector plate 23. If the air pressure or rate of air flow is too low the deflector plate 23 tends to fall under its own weight whereby plate 25 enlarges the orifice on the suction side of the fan 22. In order to control the direction of air flow from fan 22, a rear deflector plate 26 positioned behind the concave is mounted so as to be adjustable both in position and attitude.

Figure 8:
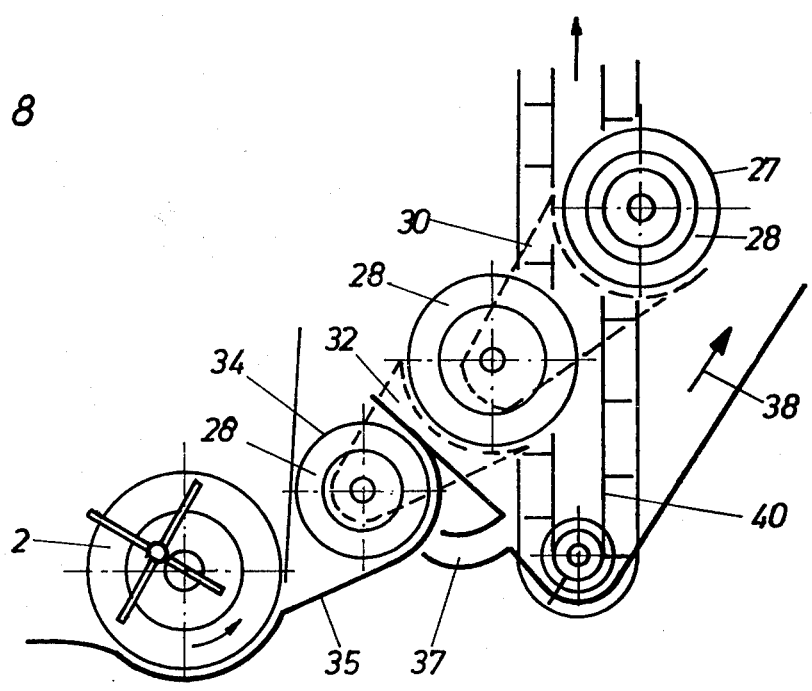
FIG. 8 shows an end elevation of the FIG. 1 embodiment, the direction of viewing being from the right in FIG. 1 and from the left in FIG. 7, so as to show the grain cleaning apparatus.
Figure 9:
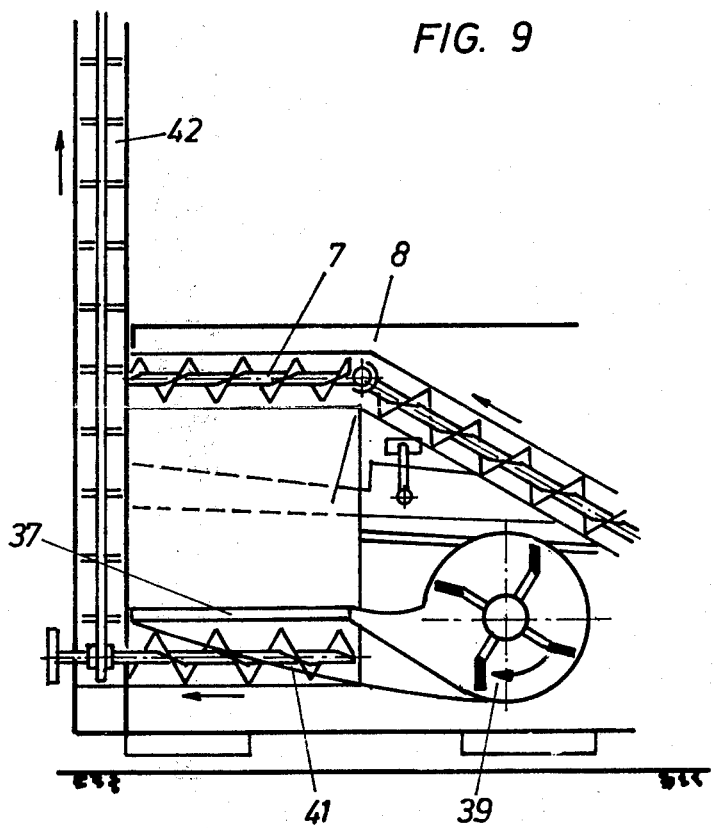
FIG. 9 shows in a view similar to that of FIG. 7, a portion of the FIG. 1 embodiment incorporating an alternative non-rotary grain cleaning device.
Figure 10:
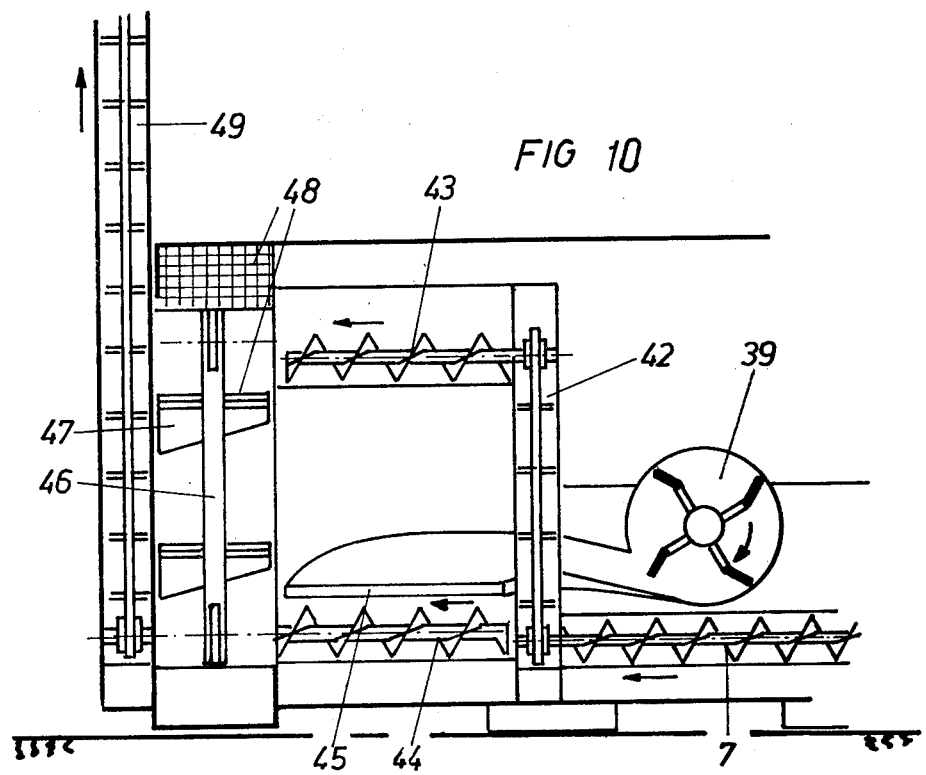
FIG. 10 shows in a view similar to that of FIG. 9, a further alternative grain cleaning device.

The grain and any other dense particles which are not carried away by the air flow fall into the conveyor auger 7 and are conveyed to a cleaning device, a first form of which is shown in FIGS. 7 and 8, and two alternative forms of which are shown in FIGS. 9 and 10.

The cleaning device shown in FIGS. 7 and 8 comprises an upper rotary cylindrical sieve or screen 27 to receive at one end the grain from the conveyor auger 7. The grain is conveyed by an auger 28 positioned inside sieve 27 to the other end thereof. During this conveying operation the grains fall through the openings of the rotary screen 27 onto a conveying auger 29 at the bottom of the cleaning device. The larger crop particles such as incompletely threshed ears of grain and also grain which did not pass through sieve 27 is discharged by auger 28 onto a deflector plate 30 which deflects it into a second rotary cylindrical screen or sieve 31 similar in structure to the screen 27. In this second screen separation takes place in the same manner as in the upper screen 27. The remaining larger particles which emerge from the screen 31 are deflected by a plate 32 into a third rotary cylindrical screen 34. The openings of the sieve 34 are larger than those of the screens 27 and 31. Accordingly, sieve 34 separates the unthreshed ears or "tailings" and these are returned via a deflector plate 35 (FIG. 8) to the feeding auger 2 which feeds them to the threshing mechanism again.

The components of the grain chaff mixture reaching sieve 34 which do not pass therethrough are conveyed by an auger 36 inside the sieve to an opening and dropped onto the ground.

The grain separated by the sieves 27 and 31 together with any remaining short straw and chaff falls through an air flow coming out of an air duct 37 from the fan 39. This air flow removes any remaining chaff and short straw from the grain.

The clean grain is collected, and conveyed by an auger 29 and a chain elevator 40 into a grain tank (not shown).

FIG. 9 shows a grain cleaning device which may be used in place of that shown in FIGS. 7 and 8 and which does not include rotary cylindrical screens. In the FIG. 9 embodiment, the conveying auger 7 bringing grain from the threshing cylinder and straw walkers extends along the full width of the cleaning device.

Auger 7 distributes the grain/chaff mixture equally over the full width of the cleaning device. Light particles are separated by an air flow coming out of an air duct 37. The thus-cleaned grain is collected and conveyed by an auger 41 and an elevator 42 into a grain tank (not shown).

FIG. 10 shows a further alternative grain cleaning device. The grain chaff mixture coming from the threshing mechanism is conveyed by auger 7 to an elevator 42 and thence into an upper auger 43. Auger 43 distributes the grain/chaff mixture over the full width of an airflow zone lying below the auger. The grain falls from auger 43 through said zone into a bottom auger 44. The light chaff and straw parts are separated by an air flow through said zone and coming out of an air duct 45 as they fall. The denser particles, mainly of grain, are conveyed by auger 44 into a sieve elevator 46. Elevator 46 is equipped with conveying boxes 47 which are covered by adjustable sieves 48. The grain delivered into elevator 46 is taken by the sieves 48 and conveyed upwards. During this conveying process the small heavy particles (i.e., the grain) fall through the sieves 48 into the conveying boxes 47. Due to the inclination of the bottom of each conveying box 47 the grain falls into a clean grain elevator 49 which carries the grain into a grain tank (not shown).

FIG. 13 shows a side elevation and FIG. 14 a plan view of a further embodiment of the invention.

In this embodiment, the crop cut by a cutter-bar 1 is transported to a feeding auger 50 constituting a feed-in conveyor. As shown in FIG. 14, auger 50 has two flights of opposite hand which feed the crop equally to two respective threshing mechanisms 51, 52 located one at each end of the cutting width of the harvester. Discharge elements in the form of a series of fingers 53 which extend, feather and retract as the auger rotates are provided at each end of auger 50 to discharge the crop rearwards into the threshing mechanisms behind auger 50. The threshing cylinders 51 and 52 thresh the grain out of the crop and discharge the straw with any remaining grain onto a straw conveying auger 54 positioned behind the threshing mechanisms. The straw conveying auger 54 conveys the straw coming from threshing cylinder 52 to the right hand end of the harvester where paddles 55 mounted on auger 54 throw the crop from both threshing mechanisms onto straw walkers 8 positioned above feeding auger 50. The straw walkers 8 convey the crop in the opposite direction to the direction of crop movement on the straw conveying auger 54.

A major part of the grain in the harvested crop is separated from the straw by the threshing concaves 56 which are positioned one beneath each of the threshing cylinders 51 and 52. The grain/chaff mixture passing through the concaves falls onto a grain auger 57.

Grain separation is also effected by auger 54 however. For this purpose, the trough 58 in which auger 54 operates is perforated or has longitudinal bars so that the trough is in the form of an elongated open-grate concave similar in structure to concaves 56. The grain which passes through trough 58 also falls onto auger 57. The grain separated by the straw walkers 8 falls onto a reciprocating pan 59 under the walkers and thence the grain is fed to auger 57.

In order to maintain cutter-bar 1 at a constant height from the ground, the cutter-bar together with trough 61 of the feeding auger 50 is carried by two gauge wheels 60. A transverse hinge 62 permits these parts of the harvester to float up and down over ground contours under the action of the gauge wheels.

Thus, the gathering cutting and feeding parts of the harvester (comprising the reel, cutter-bar 1, trough 61 of the feeding auger 50 and the feeding auger 2 or 50 itself) are free to float up and down relative to the threshing mechanism and the straw walkers 8. Accordingly, cutter-bar 1, which is supported by the wheels 60 maintains a constant height of cut over varying ground contours.

Hinge 62 also allows the gathering, cutting and feeding parts of the harvester to be detached from the rest of the machine.

In the embodiment of FIG. 15, a combine otherwise similar to that of FIGS. 1 and 3 is provided with a conventional combine reel. The tines 63 of this reel are carried by rotary reel spiders 64. As the reel, on account of its size, has to be mounted forwardly of the straw walkers 8, the cutter-bar 1 is mounted on a forward extension of trough 61 so as to be slightly in front of the straw walkers 8. The cut crop is conveyed over this extension by an additional drum conveyor 65.

In the embodiment of FIG. 16 the arrangement of reel and cutterbar is as in FIG. 15, but the feeding auger 2 is positioned directly behind the cutter-bar 1. The crop is fed by the feeding auger 2 and its fingers 4, which extend feather and retract, under a chain and slat type elevator 66. This elevator 66 could be replaced by one or more rotary beaters. The chain type elevator 66 feeds the crop to the threshing mechanism which is positioned behind it.

In the embodiment of FIG. 17, behind the cutter-bar 1 there is provided a beater 67 which feeds the cut crop directly into the threshing mechanism 68, 71. The threshing cylinder 68 extends along the full length of cutter-bar 1. However, if desired, threshing cylinder 68 can be shorter than the cutter-bar, in which case the beater 67 is provided at both ends with auger flights which convey the material laterally to the threshing cylinder 68. The threshed straw with the remaining grain emerging from the cylinder and concave passes to an auger 54 which is constructed and arranged in a manner substantially the same as that of auger 54 in FIG. 14 and which discharges the crop material onto the straw walkers 8 positioned above the threshing cylinder 68 in the same way as already shown and described in connection with FIG. 14.

The grain which passes through the perforated trough 89 in which auger 54 operates, drops via a deflector plate 69 onto a conveyor belt 70. This belt also carries the grain which passes through the threshing concave 71 and conveys it laterally towards one end of the harvester.

An air flow from a duct 72 in the direction indicated by arrow 73 at right angles to the direction of movement of belt 70 is provided to remove chaff and short straw from the grain on the belt. The material removed from the belt is deposited at the rear of the harvester.

Figure 4:
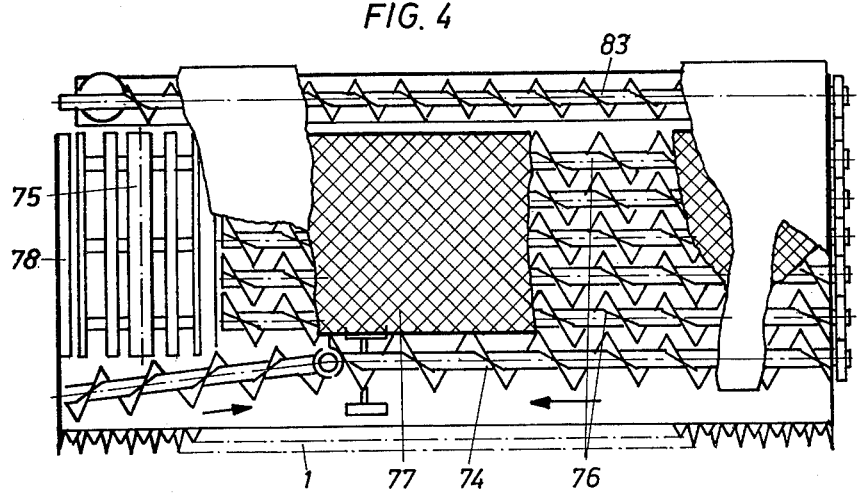
FIG. 4 shows a plan view, with portions omitted, of the FIG. 2 embodiment.
Figure 6:
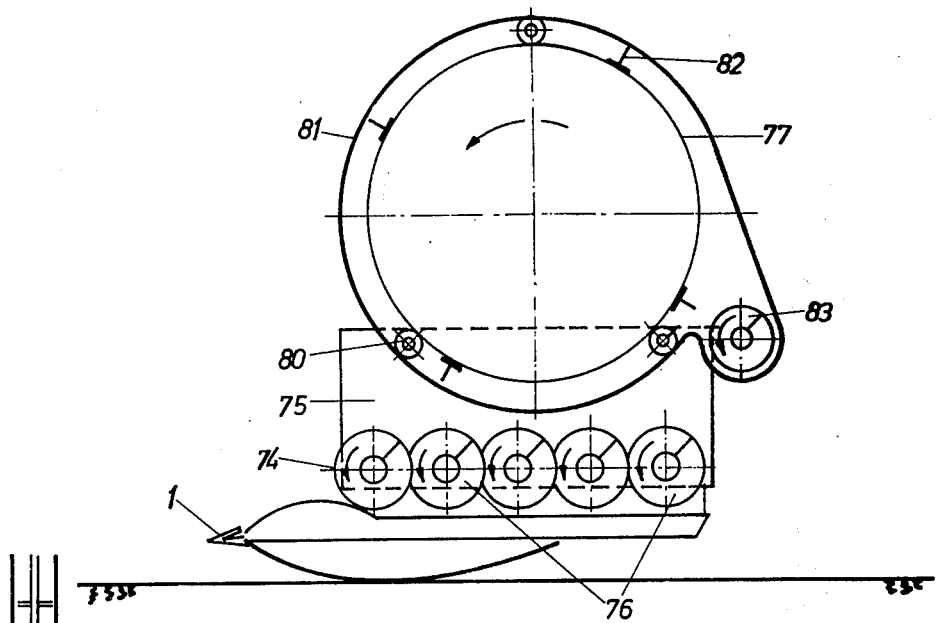
FIG. 6 shows a section on the line B—B in FIG. 2.

The embodiment illustrated in FIGS. 2, 4, and 6 will now be described.

The crop is cut by a cutter-bar 1 and delivered to a series of augers 74, 76, constituting a feed-in conveyor which convey it to a threshing cylinder 75 at one end of the harvester.

The conveying augers 74 and 76 are driven in synchronous relationship and are so positioned that the auger flights overlap.

The front conveying auger 74 includes a short portion in front of threshing cylinder 75 which has a flight of opposite hand to the remainder of the augers 74, 76 to carry cut crop past the threshing cylinder. The augers 74 and 76 feed the cut crop to a front beater 91 (FIG. 2) which itself feeds the crop into the threshing cylinder 75. The threshing cylinder rotates about an axis extending in the direction of forward motion of the harvester.

A major part of the grain is separated by passing through threshing concave 78. The grain/chaff mixture thus separated drops onto an auger 79 and is conveyed to a cleaning device such as that shown in FIGS. 7 and 8, or FIG. 9, or FIG. 10. The threshed straw with the remaining grain is thrown by the threshing cylinder 75 into a rotary cylindrical separating device or walker 77 which is positioned above the conveying augers 74 and 76.

The rotary walker 77 is supported and driven by rollers 80. Due to the rotation of the walker the remaining grain is separated from the straw and falls through a perforated wall of the walker into the bottom of a cylindrical casing 81 within which the rotary walker is mounted.

A series of paddles 82 mounted on the external surface of drum 77 convey the grain out of casing 81 rearwards into a conveying auger 83 which delivers the grain to the conveying auger 79 beneath threshing concave 78.

Rotary walker 77 can be replaced by a conventional walker 8 as shown in FIGS. 1 and 3.

The arrangement of augers 74 and 76 allows rotary walker 77 or a conventional walker to be positioned very close thereto with a minimum of vertical clearance therebetween. This reduces the overall height of the combine and also promotes equal distribution of the crop over the whole width of the threshing cylinder.

The gathering, cutting and feeding apparatus of the combine comprising cutter-bar 1, trough 61 and feeding auger 2 can be used as a swather to cut crop and deliver it to the ground. In this case the threshing mechanism and walkers are detached from the cutting and feeding apparatus.

The principal advantages provided by the embodiments of the invention described above are:

1. the provision of exceptionally compact grain harvesting apparatus;

2. the provision of grain harvesting apparatus which can be mounted as a single unit on the front of a self-propelled power unit and driven thereby. Attachment is thereby made a simple matter and the harvesting apparatus itself is rendered less expensive since it does not incorporate an engine nor traction and steering systems. The harvester therefore represents much less unproductive capital investment during the non-harvesting part of the year, than do conventional combined harvesting and threshing machines;

3. the harvester has the potential to provide much greater harvesting capacity than conventional combines since it can be scaled-up without running into road transport problems because it is well adapted to be transported endwise on a trailer behind a tractor or similar power unit.

4. the provision of separate feed-in and feed-out conveyors to feed crop to and from the threshing cylinder provides the advantage that these conveyors can be designed for the specific and different requirements of the crop at these two stages in its treatment. Where the feed-out conveyor is in the form of reciprocating straw walkers, these can be chosen to be of much greater width than the feed-in conveyor, which may simply be an auger. This ensures much more complete separation of grain from the threshed crop material. Furthermore the separate feed-in and feed-out conveyors can be separately driven and means provided for varying the speed of either or both conveyors independently during harvesting as dictated by varying crop conditions. Full details of the drives for these conveyors have not been given in this specification as it is believed that they are not needed by those skilled in the art. The methods of driving augers and straw walkers for example, are very well known.

Among modifications which can be made in the above-described embodiments without departing from the scope of the invention are:

1. the use of a draper or other pick-up device in place of the cutterbar in order to gather crop which has been previously cut by, for example, a swather;

2. the construction of the harvester as an implement to be trailed by a tractor, or as a self propelled vehicle, instead of an implement to be mounted on the front of a mobile power unit or tractor;

3. the use of row units in place of the cutterbar, for harvesting maize and similar crops.

What we claim is:

1. A crop harvesting machine including a frame; an elongated crop gathering table mounted on the frame with an open front for receiving crop material and a first and second side at opposite ends of said open front; a conveyor mounted on the elongated crop gathering table for conveying crop material toward said first side and away from said second side of the elongated crop gathering table; a crop threshing mechanism including a cylinder and concave mounted on said frame adjacent to the first side of the elongated crop gathering table, for receiving crop material from the conveyor mounted on the elongated crop gathering table and threshing the crop material; grain separating means mounted on the frame of the crop harvesting machine directly above at least a portion of the elongated crop gathering table and the conveyor mounted on the elongated crop gathering table, for receiving threshed grain and crop material from the threshing mechanism, for separating the grain from the crop material and for conveying crop material from an area adjacent to the first side of the elongated crop gathering table to a crop material discharge adjacent to the second side of the elongated crop gathering table; cleaning means mounted on said frame for receiving grain from said grain separating means and cleaning the grain; a clean grain conveyor mounted on said frame for conveying grain away from the cleaning means; and attaching means mounted on said frame for attaching the crop harvesting machine to a vehicle.

2. The crop harvester of claim 1 wherein the grain separating means is straw walkers which receive crop material from the threshing mechanism adjacent to the first side of the elongated crop gathering table and convey the crop material to a crop material discharge adjacent to the second side of the crop gathering table which is remote from the threshing mechanism.

3. The crop harvester of claim 1 wherein the grain cleaning means is mounted on the frame adjacent to a side of the elongated crop gathering table that is remote from the threshing mechanism.

4. The crop harvester of claim 1 wherein the conveyor mounted on the elongated crop gathering table is an auger that conveys crop material away from the second side of the elongated crop gathering table and then to the rear and away from the open front of the crop gathering table.

5. The crop harvester of claim 1 wherein the threshing mechanism elevates the crop material and conveys crop toward the front on the harvesting machine and onto the grain separating means.

6. The crop harvesting machine of claim 1 wherein the crop threshing mechanism in mounted on the frame to the rear of the elongated crop gathering table.

* * * * *